United States Patent [19]

Tuggle

[11] Patent Number: 5,303,476
[45] Date of Patent: Apr. 19, 1994

[54] LINE HEAD FOR A ROTARY LINE TRIMMER

[75] Inventor: Lloyd H. Tuggle, Shreveport, La.

[73] Assignee: WCI Outdoor Products, Inc., Cleveland, Ohio

[21] Appl. No.: 968,376

[22] Filed: Oct. 29, 1992

[51] Int. Cl.5 ............................................. A01D 55/00
[52] U.S. Cl. ...................................... 30/347; 30/276; 56/12.7
[58] Field of Search ................... 30/347, 276; 56/12.1, 56/12.7, DIG. 17, DIG. 20

[56] References Cited

U.S. PATENT DOCUMENTS

| D. 274,815 | 7/1984 | Ehrler et al. | D15/17 |
|---|---|---|---|
| 2,663,137 | 12/1953 | Asbury | 56/295 |
| 3,014,333 | 12/1961 | Clark | 56/295 |
| 3,444,674 | 5/1969 | Huff et al. | 56/25.4 |
| 3,474,608 | 10/1969 | Frick | 56/295 |
| 3,664,102 | 5/1972 | Reber | 56/295 |
| 3,708,967 | 1/1973 | Geist et al. | 56/12.7 |
| 3,826,068 | 7/1974 | Ballas et al. | 56/12.7 |
| 3,831,278 | 8/1974 | Voglesonger | 30/276 |
| 4,054,992 | 10/1977 | Ballas et al. | 30/276 |
| 4,065,913 | 1/1978 | Fisher et al. | 56/295 |
| 4,089,114 | 5/1978 | Doolittle et al. | 30/276 |
| 4,112,653 | 9/1978 | Ballas et al. | 56/12.7 |
| 4,190,954 | 3/1980 | Walto | 56/12.7 |
| 4,200,978 | 5/1980 | Irelan et al. | 30/276 |
| 4,259,782 | 4/1981 | Proulx | 30/276 |
| 4,295,324 | 10/1981 | Frantello et al. | 56/12.7 |
| 4,335,510 | 6/1982 | Close et al. | 30/276 |
| 4,411,069 | 10/1983 | Close et al. | 30/276 |
| 4,586,257 | 5/1986 | Rittenhouse | 30/276 |
| 4,641,431 | 2/1987 | Leming et al. | 30/276 |
| 4,987,681 | 1/1991 | Sepke | 30/276 |
| 5,023,998 | 6/1991 | Masciarella et al. | 30/276 |

Primary Examiner—Richard K. Seidel
Assistant Examiner—Hwei-Siu Payer
Attorney, Agent, or Firm—Hubbard, Tucker & Harris

[57] ABSTRACT

A line head (10) for a rotary line trimmer uses a bail (16) to clasp a single length of cutting line (18). The head has a first and second side (12, 14). The first side (12) of the head (10) has a plurality of radial ridges extending radially from a central shaft engagement hub (20). The second side has several raised portions (44, 46, 48, 50) which define a first and second channel (17, 19). The bail (16) rotates between an open position to a closed position in the first channel. The second channel (19) is dimensioned to engage the cutting line. The bail (16) has a clasp means (16c) which removably engages a lip portion (42) when the bail is in the closed position. The bail (16) also has a central portion (16b) which overlays the second channel (19) when the bail is in the closed position.

8 Claims, 3 Drawing Sheets

LINE HEAD FOR A ROTARY LINE TRIMMER

TECHNICAL FIELD OF THE INVENTION

The present invention relates to flexible line trimmers, more particularly to a line head which holds a fixed length cutting line in a channel with a bail.

BACKGROUND OF THE INVENTION

Rotary line trimmers are well known. Such trimmers incorporate a line or core as a cutting edge attached to a line head. A portion of the line extends beyond a central hub of the trimmer. When the central hub is rapidly spun by a motor, the line becomes an effective cutting device for grasses, weeds and other foliage. The line can be made of any number of durable materials such as flexible filament nylon line.

During use, the line is worn away and shortens in length and then must be replenished. There are two basic approaches to replenishing cutting line. In one approach, a supply of flexible line is wound on a spool placed within a hub. The spool and hub for the line head that is rapidly spun by the motor. Line is played out from the hub when the cutting portion of the line becomes too short. Playing the line out is accomplished either manually or automatically. Using a rotating spool has the advantage of keeping a relatively large supply of line on hand for immediate use. Consequently, it is the preferred approach for rotary line trimmers suitable for trimming tougher vegetation or a large area of vegetation. However, spools tend to be relatively complicated mechanisms that are expensive to manufacture and/or difficult to use. Also, each part adds weight and increases the likelihood of failure.

An alternative design, discussed in detail below, places a single length of line within a single head element. The line fits within a channel in the head and is mechanically held in place by a plastic tab. The head is attached to a shaft connected to the trimmer's motor. When the line is worn, the plastic tab can be opened and the line replaced. This design is lighter and less expensive to construct. However, the plastic tab used to retain the line can easily deform or break. Also, dirt and grass can keep the tab from closing. If the tab fails, the entire line can be lost.

Therefore, a need exists for an improved line head for holding a line for a rotary line trimmer. The line head should be simple and inexpensive to construct. The line head should securely hold a single length of line. The method of securing the line should be easily manipulated to remove the line. Moreover, the performance of the device should not be affected by dirt or grass.

SUMMARY OF THE INVENTION

The present invention relates to an improved line head for a rotary line trimmer of the type which utilizes a single length of cutting line within a simple frame. The line head is a circular element. Defined within the element are a first channel and a second channel. A bail is recessed in the first channel. A length of cutting line is recessed in the second channel.

One end of the bail is rotatably fixed to the frame and the other end is freely lifted and lowered to open and to close the bail. In the open position, the second channel is unobstructed. In the closed position, the bail fits flush within the first channel so that the surface and perimeter of the line head is substantially smooth. The free end of the bail includes a clasp designed to engage a recessed lip across one end of the first channel. The lip portion is designed to allow the operator to easily manipulate the clasp. The lip portion is also recessed from the perimeter of the line head. A central portion of the bail is positioned across the second channel. Therefore, when the bail is closed, it is protected from interference or forces which might open the bail when the head is in use.

In the preferred embodiment, the cutting line has a centrally located sleeve. The second channel is dimensioned in depth to closely match the width of the sleeve. Therefore, when the bail is in the closed position, the central portion of the bail can contact the sleeve thereby holding it securely within the first channel. Additionally, tabs extend into the second channel on either side of the sleeve to prevent lateral movement of the line. After the line is inserted in the first channel, the bail is lowered toward the closed position until it contacts the lip portion of the frame. The clasp, an S-shaped bend in the free-end of the bail, gives as it is forced over the lip portion and then springs back to securely grip the lip. Once seated, the bail will open only when manipulated by the operator. Dirt or grass does not interfere with opening and closing the bail to remove the cutting line. An outwardly extending tab, received within a notch formed in a rim surrounding the head so that it does not interfere with rotation of the head, allows a human finger to reach in and to lift the clasp away from the lip to open the bail.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE DRAWINGS

Figure 6:
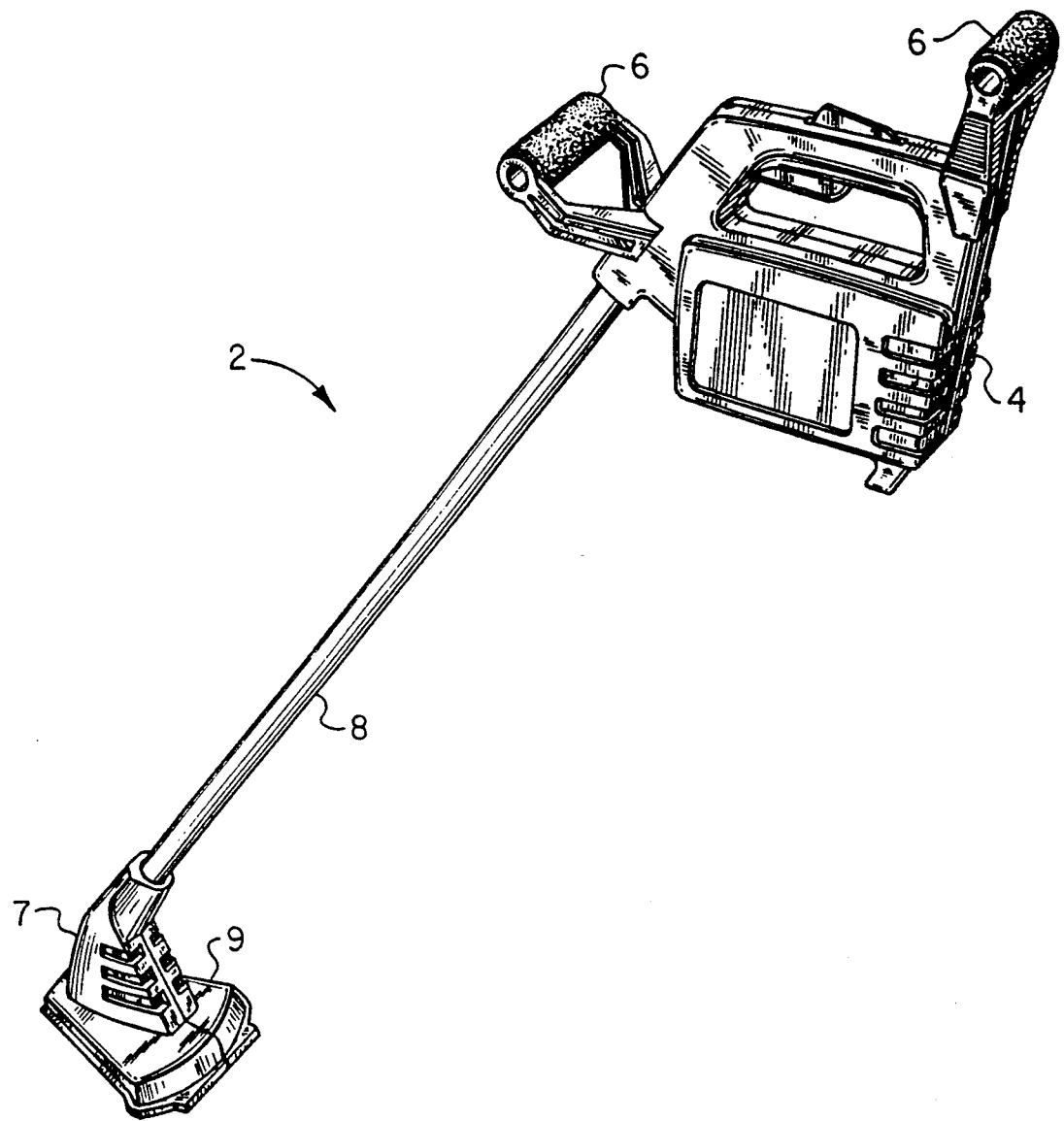
FIG. 6 is a perspective view of a rotary line trimmer of the type utilizing the present line head.

The present invention relates to a line head for a rotary line trimmer that overcomes many of the disadvantages found in the prior art. FIG. 6 illustrates a rotary line trimmer of the type utilizing the present line head. The line trimmer 2 comprises a battery pack 4 attached to a handle 6. The handle 6 is attached to one end of a shaft 8. A housing for an electric motor (not shown) is attached to the distal end of the shaft. A guard shield 9 is attached to the motor housing. The line head (not shown) is surrounded by the guard shield and coupled to the output shaft of the electric motor.

Figure 5:
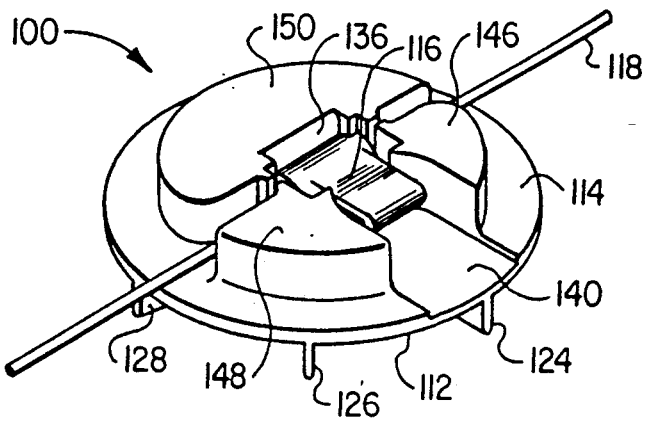
FIG. 5 is a perspective view of the prior art cutter head.

FIG. 5 illustrates the prior art line head 100 with a first side 112 and second side 114. The first side has a number of radial ridges 124, 126, 128 extending outward from a central shaft engaging hub. The second side has several raised portions 146, 148, and 150 which define a line engagement path and a tab path. The head 100 holds a line 118 with a plastic tab 116. The tab is lodged in the frame between walls 136 and can rotate between an open and a closed position. The tab 116 does not engage a lip portion. Instead, the head 100 has a flat portion 140 which allows the operator to slip his finger under the tab to open it. This is more awkward to manipulate and not as reliable as desired. For example, cut grass can clog between the tab 116 and the flat portion 140 making it difficult to grasp the tab and the cut grass can clog walls 136 and tab 116, making it difficult to open.

Figure 1:
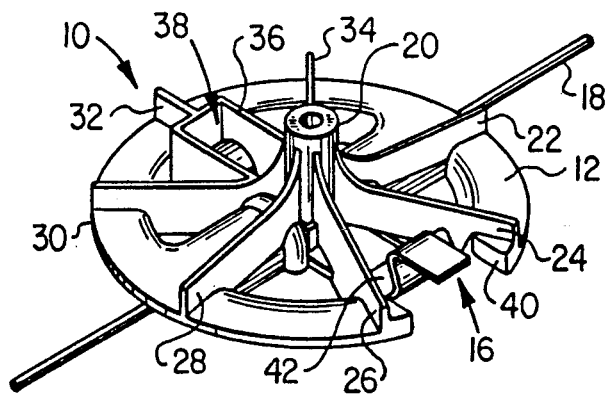
FIG. 1 provides a perspective view of the bottom of the present invention.
Figure 2:
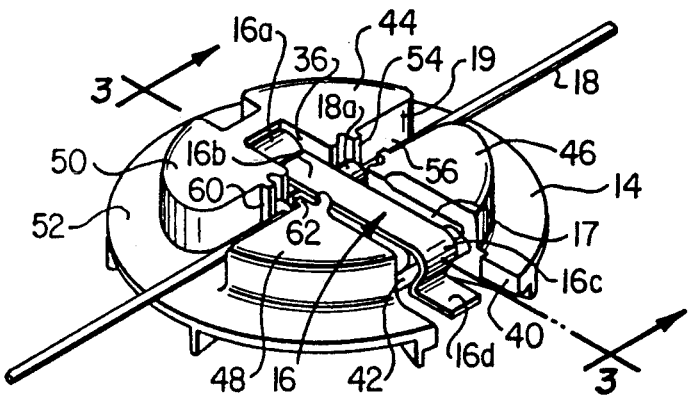
FIG. 2 provides a perspective view of the top of the present invention.

FIGS. 1 and 2 provide perspective views of a line head 10 embodying the present invention. The line head 10 is generally circular with a first side 12 and a second side 14. Referring to FIG. 1, the first side 12 of the head 10 has a plurality of radial ridges 22, 24, 26, 28, 30, 32, and 34 extending outward from a centrally located shaft engagement hub 20 to the perimeter of the head 10 and act as cooling fins for the electric motor in the head. The ridges add rigidity to the cutting head. One of the radial ridges 32 is split to form a cavity 38 with walls 36. A notch 40 is formed on the circumference of head 10 adjacent to a recessed lip portion 42. A length of flexible cutting line 18 is shown extending beyond the head 10.

Referring to FIG. 2, the second side 14 of head 10 is shown. The second side comprises a number of raised portions 44, 46, 48, and 50. The raised portions have generally planar surfaces. Collectively, they form a relatively smooth and flat surface that can engage the ground during rotation of the head a generally smooth perimeter wall. Extending outwardly from the bottom of the perimeter wall is a depressed rim 52. The raised portions define a first channel 17 and a second channel 19. The first channel 17 is dimensioned to receive the bail 16. The second channel 19 is dimensioned to receive a cutting line 18. The first and second channel are substantially perpendicular to each other. Attached to the line 18 is a centrally located sleeve 18a. The sleeve 18a fits between and is axially retained by tabs 54, 56, 60 and 62 which extend into the second channel 19 from the raised portions 44, 46, 48, 50, respectively. The distance between opposed tabs is greater than the diameter of the line 18 but less than the diameter of the sleeve 18a to allow line 18 and sleeve 18a to be lifted from channel 19.

Figure 3:
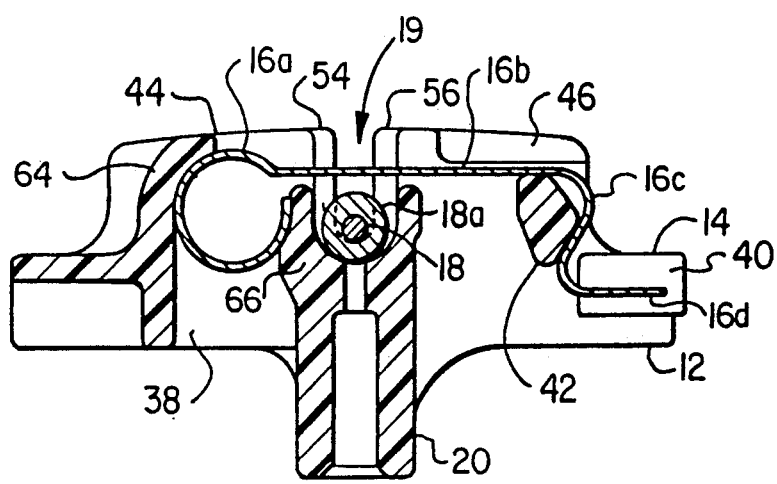
FIG. 3 provides a sectional view along line 3—3 of FIG. 2 with the clasp in a closed position.
Figure 4:
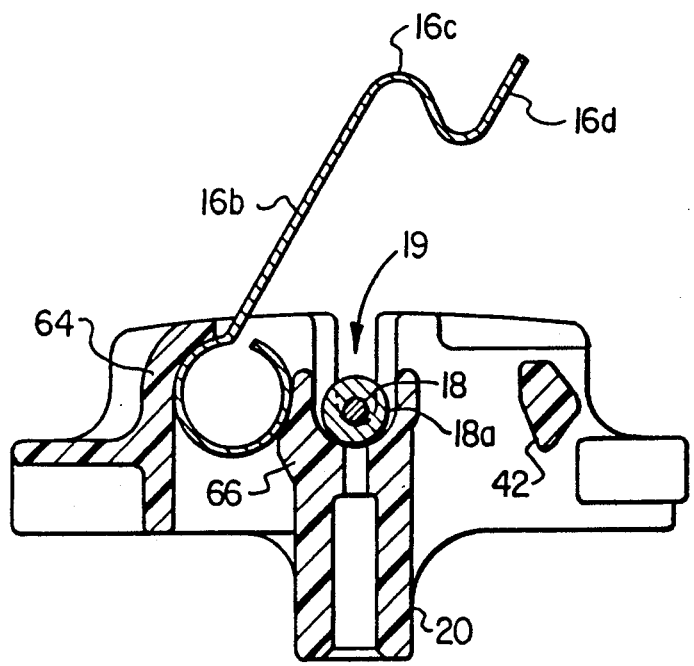
FIG. 4 provides a sectional view across the trimmer head with the clasp in an open position.

As mentioned, the first channel 17 is dimensioned for receiving the bail 16. The bail has a first end 16a, a central portion 16b, a clasp portion 16c and a tab portion 16d. The first end 16a fits within the walls 36 so that the bail can rotate between a first open position and a second closed position. The bail 16 is shown in the closed position with the clasp 16c engaged with the lip portion 42. Note that line 18 is securely held within the second channel 19 by the central portion 16b of the bail 16, and the central portion 16b is in the first channel and below the surface of the raised portions, FIGS. 3 and 4 provide sectional views across the head 10 perpendicular to the second channel 19 with the bail in the closed and open position, respectively. The bail is essentially a rigid, metal strap which extends across the second channel. The first end 16a of bail 16 is permanently deformed into a generally cylindrical shape. The first end 16a is popped into place from side 12, and thereby rotatably secured, between a first wall 64 and a second wall 66 within opening 38. As seen clearly from the figures, the cylindrical loop or shape is not completely closed, allowing the shape to deform in order to push it into place from side 12 and then return to its original shape. Bail 16 cannot be removed from side 14. Nor can it be removed from side 12 after head 10 is secured to the shaft of the electric motor and housing 7. Walls 64, 66 are curved to present a complementary surface to the first end 16a of the bail 16. The method of assembling the bail to the head thus requires no fasteners and cannot come apart once assembled and installed on the trimmer. In the closed position, the clasp means 16c engages lip portion 42. The clasp means 16c is generally "S" shaped and must deform to force fit over the lip portion. A bail end is formed into a tab 16d that extends into the notch 40 thereby allowing for easy manipulation by the operator. The tab is generally located in the plane of the rim between the first and second sides 12, 14. This recessed placement prevents the bail from being accidentally opened or otherwise catching vegetation and other items on the ground when the head is in use. Closing and opening the bail also wipes dirt and other debris from the lip and clasp, thus preventing buildup of dirt in the clasp area. The notch is sized to allow the operator to seize the end 16d with a finger. As can be seen in FIG. 4, the curvature of wall 64 limits rotation of bail 16 at a point when the end of wall 64 hits central portion 16b of the bail. In this position, clasp section 16c and tab 16d are shown to be on the side of the axis of rotation to the line head opposite the cylindrically shaped end of the bail. Centrifugal forces generated by rotation of the line head will consequently tend to close the clasp and thus prevent damage to the clasp if inadvertently left open and lowered into vegetation during rotation of the head.

Tabs 54 and 56 are shown extending into channel 19 from raised portions 44 and 46, respectively. The distance between the tabs 54 and 56 is greater than the diameter of line 18 but less than the diameter of line sleeve 18a. Tabs 54 and 56 along with tabs 60, 62 (shown in FIG. 2) prevent lateral movement of the line. The tabs are integrally formed with the raised portions. As shown in FIGS. 3 and 4, the first side 12 opposes the second side 14. The cavity 38 communicates between said sides. The cavity 38 has a first opening 38a and a second opening 38b. The first opening 38a is larger than the second opening 38b. The first opening 38a is large enough to allow the cylindrical portion 16a of the strap to be elastically deformed and inserted between the walls 64, 66.

Although preferred embodiments of the invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the invention.

I claim:

1. A line head for use with a rotary line trimmer, said line head comprising:
   (a) a frame with a first and second side, said frame dimensioned to engage the rotary line trimmer, said second side being substantially smooth and having a perimeter with first and second channels defined therein, wherein the second channel is dimensioned to engage a length of cutting line;

(b) a lip across the first channel and recessed below the second side and inwardly of the perimeter;

(c) a generally rigid strap fastened at one end to said frame within the first channel, said strap rotatable between an open position and a closed position; and (d) a clasp on the other end of the strap for removably engaging the lip, said clasp being elastically deformable outwardly to fit over the lip and to spring back inwardly to fit under the lip to securely grasp the lip.

2. The line head of claim 1 wherein the clasp includes an outwardly extending tab for manually bending the clasp outwardly to release the clasp, the tab remaining recessed within a notch in a rim extending radially outwardly from the perimeter when the strap is in a closed position.

3. The line head of claim 1 wherein the strap is rotatably fastened to said frame.

4. The line head of claim 3 wherein the strap has a cylindrically shaped portion and is curved into a cylindrical shape at the end opposite the clasp and wherein the frame includes curved walls for retaining the curved end of the strap and for allowing rotation of the cylindrically shaped portion within the curved walls, the cylindrically shaped end of the strap being elastically deformable during insertion between the curved walls.

5. The line head of claim 4 wherein the curved walls include an upper ridge which contacts and limits rotation of the strap in the direction of the open position.

6. The line head of claim 4 wherein the frame has a first opening through the first side between the curved walls, and a second opening through the second side, wherein the first opening is larger than the second opening, the first opening being large enough to allow the cylindrically shaped portion of the strap to be elastically deformed and inserted between the curved walls.

7. The line head of claim 1 wherein the strap is attached to said frame such that rotation of the frame tends to force the strap to the closed position.

8. The line head of claim 1 wherein said first side comprises a series of radial ridges.

* * * * *